Patented Dec. 4, 1951

2,577,636

UNITED STATES PATENT OFFICE 2,577,636

SULFURIZATION OF LARD OIL

Elmer H. Sperry, Drexel Hill, Pa., assignor to Sun Oil Company, Philadelphia, Pa., a corporation of New Jersey No Drawing. Application May 7, 1949, Serial No. 92,073

5 Claims. (Cl. 260—399)

This invention relates to a novel process for the sulfurization of lard oil, or blends of lard oil and mineral oils, to prepare a sulfurized lard oil product suitable for use in the compounding of cutting oils, gear lubricants and other substances.

The sulfurization of lard oil has been known for a long time. For example, it has been the practice to sulfurize lard oil by use of sulfur or sulfur chloride. When using sulfur, say as flour of sulfur, the desired quantity has been admixed with the lard oil heated to a temperature in the range of say 325° F.— 475° F., and the mixture stirred at such temperature for a time sufficient to cause the desired sulfurization, and to "fix" the sulfur. Thus, it has been a requisite in the prior art to employ high temperatures for the sulfurization of lard oil. When lard oil is heated to the aforesaid elevated temperatures to cause dissolution and fixing of the sulfur therein, the oil tends to decompose, and products having an acrid odor are formed. This heating of lard oil is accompanied by oxidation of the oil, resulting in rancidity, color deterioration and large increases in viscosity.

An object of this invention is the provision of a process for the sulfurization of lard oil without causing the above-mentioned decomposition, the formation of products having an acrid odor, or the oxidation and concomitant rancidity and darkening of the oil.

Another object of the invention is the provision of a process for the sulfurization of lard oil which yields a sulfurized lard oil product which has better color and lower viscosity than is obtained by the conventional high temperature processes.

It has now been discovered that lard oil may be rapidly sulfurized at ordinary temperature by contacting hydrogen sulfide and sulfur dioxide in the presence of the lard oil. Thus, the process of the present invention eliminates the disadvantages of the prior art high temperature processes, and results in an improved sulfurized product, as hereinafter fully described.

In carrying out the process of the present invention, it is preferred to introduce the hydrogen sulfide and sulfur dioxide separately and simultaneously into the lard oil. If the hydrogen sulfide and sulfur dioxide are premixed before introduction into the lard oil, elemental sulfur may be formed, which deposits on the walls of the gas conduit and thereby causes plugging. Any so formed sulfur which may pass into the lard oil does not operate to sulfurize the lard oil at the low temperatures employed by the present process, as is hereinafter demonstrated.

In carrying out the present process, it is preferred that the lard oil be agitated during the simultaneous but separate introduction of the gases to insure rapid and complete contacting thereof. However, the agitation obtained by the introduction of the gases may be sufficient so that mechanical agitation is unnecessary.

As above stated, the present process is performed at ordinary temperatures. Thus, temperature controls and means for supplying heat to the reaction mixture are unnecessary, ambient temperature being preferred. By "ambient temperature" is meant that no temperature control is applied to the reaction mixture. The reaction is somewhat exothermic, and hence a slight rise of temperature may be observed during the sulfurization. However, this rise of temperature is practically insignificant, and will seldom, if ever, exceed about 10° F. It is believed obvious that temperatures somewhat above or below that of the environment may be employed, say temperatures of from 50° F. to 100° F., but in no event should a temperature sufficiently high to cause the deleterious effects observed in prior art high temperature sulfurizations be employed. As above explained, the present invention provides for the rapid sulfurization of lard oil at ambient temperature, and hence the use of even slightly elevated temperatures, in general, is unnecessary and provides no advantages over the use of ambient temperature.

The pressure employed may advantageously be atmospheric. Thus, the process may be performed by introducing hydrogen sulfide and sulfur dioxide simultaneously, but separately, into lard oil contained in an open vessel. Where the introduction of a large percentage of sulfur into the lard oil is desired, the process may advantageously be performed under greater than atmospheric pressure, but for most purposes, superatmospheric pressures are unnecessary.

It is preferred to introduce into the lard oil about 2 moles of hydrogen sulfide for each mole of sulfur dioxide, since, as has been found, this ratio results in the utilization of practically the entire amount of the gases added. The mole ratio of hydrogen sulfide to sulfur dioxide may, however, be varied from about 1:1 to about 4:1, and good results obtained thereby.

The rate of addition of the gases to lard oil may be substantially varied without deleterious effects, and the rate of such addition is not considered a critical variable. The most advantageous rate of addition will depend largely upon the design of the apparatus employed. Thus, it is obvious that the rate of addition of the gases should not be such that a substantial amount thereof leaves the lard oil without entering into the reaction, and this in turn will depend upon the apparatus design, the agitation supplied to the reaction mixture, and the like. In general, it is preferred to add from about 0.1 to 1.0 mole of hydrogen sulfide per hour to 100 grams of lard oil, the rate of addition of sulfur dioxide being selected to come within the mole ratios above defined. It should be noted that any effluent gases cannot advantageously be recycled to the process because such effluent gases, of necessity, consist of a mixture of hydrogen sulfide, sulfur dioxide, and water vapor, and the use of such mixtures is undesirable, as above explained.

The time required for sulfurization depends upon the rate of addition of the hydrogen sulfide and sulfur dioxide to a given quantity of lard oil, which in turn depends upon the apparatus design, agitation supplied to the reaction mixture, and similar variables, and also upon the degree of sulfurization desired. Accordingly, a determination of the appropriate time for sulfurization in each given application should be made, and in light of the teachings of the present specification, such determination is within the scope of those skilled in the pertinent art. Example 2, set forth hereinafter, is indicative of the time required to obtain a certain degree of sulfurization under the conditions specified therein.

Further preferred embodiments of the present invention employ hydrogen sulfide and sulfur dioxide to sulfurize a mixture of mineral oil and lard oil. Thus, where it is desired to prepare, e. g., a cutting oil consisting of about 90% mineral oil and 10% sulfurized lard oil, a mixture of the appropriate portions of mineral oil and lard oil may be subjected to the present process, and the desired composition obtained directly therefrom. The proportions of mineral and lard oil to employ will, of course, be varied in accordance with the product desired and the application contemplated. Thus, mixtures of from 10 to 90 parts of mineral oil with from 90 to 10 parts of lard oil may be employed in the process of the present invention, and the products obtained therefrom used directly in applications such as cutting oils, gear lubricants, and the like, or such mixtures may be further compounded for special applications.

The following examples illustrate the process of the present invention, which is not to be considered as limited thereby.

EXAMPLE 1

Gaseous hydrogen sulfide was contacted with sulfur dioxide in the presence of lard oil by simultaneously, but separately, introducing the gases into about 100 grams of No. 1 lard oil contained in an open vessel. The rates of addition of the gases were about 0.1 mole of hydrogen sulfide per hour and 0.05 mole of sulfur dioxide per hour, the total time of introduction being 6 hours. The process was carried out at ambient temperature, and no substantial rise in temperature was observed throughout the process. After cold stabilization, the product had a sulfur content of 5.3%.

EXAMPLE 2

The process of Example 1 was repeated over a period of 12 hours, the same conditions of operation being employed. Samples were withdrawn at the end of 3 and 6 hours. The products were stabilized at 35° F. for 3 weeks, filtered, and analyzed. The analysis showed sulfurization of the lard oil as follows:

*Total sulfur*

| | Per cent |
|---|---|
| After 3 hours | 3.92 |
| After 6 hours | 6.90 |
| After 12 hours | 14.05 |

These data indicated that the efficiency of the process does not decrease even after relatively large amounts of sulfur had been introduced into the lard oil.

EXAMPLE 3

No. 1 lard oil was agitated with an excess of sulfur flour at ambient temperature for 16 hours. The filtered product contained only 0.61% sulfur. This illustrates the ineffectiveness of a room temperature, or ambient temperature sulfurization with sulfur flour. It also verifies the belief of the art in the necessity for the use of high temperatures to effect sulfurization of lard oil with sulfur.

EXAMPLE 4

Another room temperature sulfurization according to the invention was effected upon No. 1 lard oil and also on a 50%–50% blend of No. 1 lard oil and mineral oil, the process of Example 1 being substantially duplicated. The treatment was continued for twelve hours, and the product stabilized for four months at 35° F. The filtered products analyzed:

| | No. 1 Lard Oil | 50% Mineral Oil, 50% No. 1 Lard Oil |
|---|---|---|
| Gravity | | 19.2 |
| S. U. Viscosity | 63/210° | 275/100° |
| N. P. A. Color | 8 Dil | 4 Dil |
| Total S | 13.4% | 4.04% |

EXAMPLE 5

To compare the product of this invention with that obtained by the conventional high temperature heating process, lard oil sulfurized with sulfur flour at 350° F. was prepared. Color and viscosity measurements were made and compared with the comparable product of Example 4.

| | Sulfurized Lard Oil | |
|---|---|---|
| Method | $H_2S+SO_2$ | Sulfur Flour. |
| S. U. Viscosity | 63/210° | Over 500/210°. |
| N. P. A. Color | 8 Dil | Too dark by Dil. |

It is at once apparent that the color and viscosity improvements are substantial.

The sulfurized product of this invention can be compounded to yield a good cutting oil by adding a minor proportion of it to mineral oils usually employed for the purpose. Also, it can be used to prepare gear lubricants by compounding it with mineral oils of suitable viscosities.

Modification and variation are possible within the scope of the appended claims, the foregoing disclosure having for its purpose to set forth the essence of the invention. As illustrative of a modification of the present invention is the premixing of hydrogen sulfide and sulfur dioxide immediately prior to their introduction into the lard oil, such premixing preferably being performed under substantially anhydrous conditions to minimize the formation of elemental sulfur. However, such a modification is not preferred for the reasons hereinbefore discussed.

This application is a continuation-in-part of my copending application Serial No. 775,384, filed September 20, 1947, now abandoned.

I claim:
1. A process of sulfurizing lard oil which comprises contacting hydrogen sulfide and sulfur dioxide in the presence of said lard oil at a temperature of from 50° F. to 100° F.
2. A process of sulfurizing lard oil which comprises simultaneously, but separately, introducing hydrogen sulfide and sulfur dioxide into lard oil at a temperature of from 50° F. to 100° F. and atmospheric pressure.
3. The process according to claim 1 wherein about 2 moles of hydrogen sulfide per mole of sulfur dioxide is employed.
4. The process of sulfurizing lard oil which comprises simultaneously, and separately, introducing hydrogen sulfide and sulfur dioxide into lard oil at a temperature of from 50° F. to 100° F., said hydrogen sulfide being introduced at a rate of from 0.1 to 1.0 mole per hour per 100 grams of lard oil, and said sulfur dioxide being introduced at a rate of from 0.025 to 1.0 mole per hour per 100 grams of lard oil.
5. The process of sulfurizing a blend of mineral oil and lard oil which comprises contacting hydrogen sulfide and sulfur dioxide in the presence of a mixture of said mineral oil and lard oil, said contacting being performed at a temperature of from 50° F. to 100° F.

ELMER H. SPERRY.

REFERENCES CITED

The following references are of record in the file of this patent:

UNITED STATES PATENTS

| Number | Name | Date |
|---|---|---|
| 2,061,019 | Carter | Nov. 17, 1936 |
| 2,109,692 | Forney | Mar. 1, 1938 |
| 2,111,882 | Borglin | Mar. 22, 1938 |

OTHER REFERENCES

Mellor, Inorganic Chemistry, vol. 10, 1930, page 92.